United States Patent [19]

Doelves et al.

[11] 4,057,838
[45] Nov. 8, 1977

[54] PROCESS AND APPARATUS FOR EXACTLY ADJUSTING THE BEGINNING AND END OF REPRODUCING IN AN ENGRAVING UNIT

[75] Inventors: Juergen Doelves; Dieter Herforth, both of Kiel, Germany

[73] Assignee: Dr. -Ing. Rudolf Hell GmbH, Germany

[21] Appl. No.: 670,405

[22] Filed: Mar. 25, 1976

[30] Foreign Application Priority Data

Mar. 25, 1975 Germany .............................. 2513042

[51] Int. Cl.² ............................................ H04N 1/26
[52] U.S. Cl. .................................. 358/299; 358/272
[58] Field of Search ............ 178/69.5 F, 6.6 A, 6.6 B, 178/6.7 R; 358/272, 299

[56] References Cited

U.S. PATENT DOCUMENTS

| 2,141,973 | 12/1938 | Finch | 178/69.5 F |
| 3,272,918 | 9/1966 | Koll | 178/6.6 A |

*Primary Examiner*—Howard W. Britton
*Attorney, Agent, or Firm*—Hill, Gross, Simpson, Van Santen, Steadman, Chiara & Simpson

[57] ABSTRACT

Apparatus and method for exactly locating and adjusting the beginning and end of reproduction of an image pattern reproduced from a master picture attached to a rotating scanning cylinder which is reproduced on a rotating printing cylinder and wherein the adjustment is made by a circumferential pulse adjustment movable relative to a permanent circumferential mark in which process the image pattern is optoelectronically scanned, dot and image-line wise, to convert the image pattern into an electrical image signal and wherein the analog image signal is converted into a digital signal with the aid of a scanning pulse sequence device and the data obtained is stored into a memory after which the information is read from the memory with the aid of a recording pulse device and reconverted into an analog image signal and during the process of recording on the printing cylinder the timing of the recording pulse sequence train controls an engraving device and the movement of an engraving member, whereas the timing of the scanning pulse sequence train controls a scanning device and the movement of a scanning member. The movements are carried out in the axial direction of the cylinders.

7 Claims, 8 Drawing Figures

PROCESS AND APPARATUS FOR EXACTLY ADJUSTING THE BEGINNING AND END OF REPRODUCING IN AN ENGRAVING UNIT

BACKGROUND OF THE INVENTION

1. Field of the Invention

This invention relates in general to the process and apparatus for opto-electrically scanning and reproducing images.

2. Description of the Prior Art

It has been known to utilize printing cylinders for intaglio printing with existing engraving units. In such apparatus, the image pattern to be reproduced which can contain half-tone pictures and lettering is attached to a rotating scanning cylinder and is scanned, image line by image line, by a light spot scanning member which can be moved axially of the scanning cylinder. The scanning of an image line occurs on a circular circumferential line of the scanning cylinder and after scanning of an image line, the scanning device is moved a distance of two image lines and then the next image line is scanned.

According to the gray tone value of the scanned image dots, more or less light will be reflected from the image pattern onto the scanning device and will be converted by it electro-optically into an analog image signal. The analog image signal is converted to digital information by using a scanning pulse sequence device and the digital data thus obtained is stored into an image line memory. The stored data is read out when desired with the aid of a recording pulse sequence means and reconverted into an analog image signal.

For the production of an intaglio printing raster, a raster signal derived from the recording pulse sequence device is super-imposed on the image signal. The image signal and raster signal control a recording member which may be in the form of a mechanical engraving member having an engraving needle as a cutting tool which is controlled by the information supplied to it.

The raster signal produces a vibrating lifting motion of the engraving needle which, due to this movement, engraves a series of depressions hereinafter referred to as "cuplets" into the rotating printing cylinder. The image signal determines the penetration depth of the engraving needle into the cuplets on the printing cylinder and, ultimately, the gray tone values which will be reproduced.

After a closed circumferential line has been engraved, the engraving tool will be advanced a distance of two image lines and during this time of advancement the engraving is interrupted. After the advancing motion has occurred, the engraving of the next circumferential line begins with a series of cuplets which are arranged such that they are staggered relative to the cuplets of the previously engraved circumferential line.

The scanning cylinder has a fixed circumference and is a component part of the engraving unit, but printing cylinders having differing diameters can be installed on the engraving unit. The scanning cylinder and the printing cylinder are coupled to each other and driven by common synchronous motor. The number of revolutions of the scanning and printing cylinders is adjusted in such a way that when the frequency of the recording pulse sequence device remains constant that an integral number of cuplets is engraved on a closed circumferential line of the printing cylinder which line exactly corresponds to an image line.

The frequency of the scanning pulse sequence is determined such that on an image line from the top to the bottom edge of the image pattern exactly as many image dots are scanned as there are cuplets on the circumferential line of the printing cylinder.

The engraved printing cylinder is the printing form for an intaglio rotary machine. Before the printing operation the cuplets take up more or less ink, according to their volume. During the printing operation, the ink is transferred from the cuplets onto the printing carrier and the gray tone value of a printed surface is determined by the volume of the cuplets arranged in a raster form on this surface and by the amount of ink stored in them. For a multicolor printing operation, a printing cylinder for each color component is engraved. In the intaglio rotary machine during the passage of the printing carrier there occurs the super-imposing of the differently colored printing cylinders of a color set to a color printing. This composite printing must be carried out very exactly so that mismatch, misindexing or misregistrations will not occur. The experts who operate such complicated machinery can detect misregistrations, mismatches and misindexing by watching with the human eye and examining the finished color prints. Misregistrations can occur during the engraving of the printing cylinders because of varying positions of the engraving or of parts of the engraving on the printing cylinders of a color set or, on the other hand, during the printing operation itself by an insufficient and inaccurate synchronism between the printing cylinders and the printing carrier.

Whereas, inaccurate synchronism can be corrected by governing devices, it is not possible to compensate in the printing machine for misregistrations which arise because of inexact positioning of the engraving or of parts of the engraving on the printing cylinder on a color set.

So as to achieve high quality reproduction, the engraving on the printing cylinders must take place with great precision with an exactness of about 1/100 mm. In special engraving processes, the starting and ending of the reproduction must be adjusted with the same degree of accuracy.

The special engraving processes known to the experts as frame suppression, subsequent engraving and seamless engraving will be briefly described.

Frequently, the image pattern to be reproduced has margins running in the axial direction of the scanning cylinder which contain, for example, the perforations of an accurate fitting arrangement of the image pattern on the scanning cylinder with the aid of register pegs. It can also happen that the image pattern does not completely fill the cylinder's circumference and a part of the cylinder surface is visible.

Since the scanning member scans the entire circumferential surface of the scanning cylinder, however, the beginning and end of the scanning must be determined in such a way that the image signal only reaches the engraving member when the scanning member is scanning the information carrying part of the image pattern. On the other hand, information picked up by the scanning member which is not to be recorded can also be eliminated by suppression of the image signal with the use of controlling signals.

On prior art engraving units, these control signals are obtained from pulse generators consisting of a drum attached to the cylinder axis and utilizing a fixed scanner.

On the drum, there are reflectors arranged which at a predetermined momentary position of the cylinder relative to the scanning member reflect into the fixed scanner the light emanating from a light source. The scanner generates by opto-electrical conversion means, electronic control signals from the reflected light which can be used to control the image signal for the purpose of frame suppression.

In practice it is very difficult to position the reflectors with the required matching preciseness so that the control signals appear at precisely that point in time at which the top or bottom edges of the image pattern move beneath the scanning member. The adjustment of the beginning and end of scanning can on the prior art engraving units not be accomplished under operating conditions during the rotation of the cylinders but must be accomplished while the cylinders are stationary.

SUMMARY OF THE INVENTION

The engraving unit of the present invention utilizes synchronization of the scanning pulse sequence device with the rotation of the cylinders to control the beginning and end of scanning. The problem of assuring that synchronism is accomplished such that at the moment of pulse reference, the image spot is precisely located under the scanning member at which location the scanning is to be begun or ended.

Further, work processes are entitled "subsequent" engraving wherein parts of the image pattern which are to be subsequently engraved and must exactly match require the mounting of partially engraved printing cylinders at very precise circumferential locations relative to the scanning cylinder. This problem arises in magazine printing when, for example, a magazine page contains an advertising section and a current events section. Long before the magazine is published the advertising section is engraved and proof-printed so that it can be sent to the advertiser who will approve the proof for quality control and content. The current events section, on the other hand, is not engraved until just before completion of the magazine. It is imperative, therefore, that the subsequent engraving must be positioned on all printing cylinders of a color set with an exact match to the initial engraving. Since on the known engraving units no coordination exist between the beginning of engraving and the cylinder rotation and the scanning cylinder and the printing cylinder rotate displaced in relationship to each other after each run the above indicated objectives cannot be accomplished without a supplementary device.

From American Patent Application Serial No. 531,083 such supplementary device is known with which one cylinder can be rotated relative to the other in order to begin the engraving at a specific point on the circumference of the printing cylinder or to re-establish the original position of image pattern and engraving as they were present at the initial engraving.

The above described problem of the relative rotation of the cylinders would not be of significance with the proposed engraving unit since scanning cylinder and printing cylinder are coupled to each other. It develops, however, that with a cylinder change the exactness of the angular position of the scanning cylinder to printing cylinder is lost. For this reason, it is necessary that even in connection with the relative shift of the cylinders when a printing cylinder is changed the second engraving must also be positioned to obtain an exact match to the first engraving. The problem to be solved consists in synchronizing with a recording pulse sequence and rotation of the cylinders in such a way that at the pulse instant, precisely that point of the printing cylinders is located under the engraving member at which the recording is to begin with the engraving of the first cuplet. The invention therefore refers to a process in which the beginning can be very precisely adjusted in order to eliminate the disadvantages.

Another process to be accomplished is the so-called seamless engraving wherein printing of endless webs with periodically re-occurring patterns or imitations of wood grains requires that a printing cylinder with an endless pattern be obtained. Although the known engraving units engrave seamlessly in principle, in other words, the cuplets on the printing cylinders are arranged without gaps in the raster, but the engraving of a seamless pattern is not possible because of the image pattern without supplementary equipment. At the point where the top and bottom edges of the image pattern come together running in the axial direction of the scanning cylinder, there occurs during engraving a seamline running on one axial line of the printing cylinder.

Processes for seamless engraving have now become known in which the image pattern is scanned by a special complementary devices in such a way that during the engraving no visible seam occurs. Thus, as disclosed in British Pat. No. 904,661 the image pattern is mounted on the scanning cylinder and is scanned by two scanning members which are arranged on the circumference of the scanning cylinder 180° apart. After each rotation of the scanning cylinder, there is change-over to the other scanning member.

Experience has shown that the formation of a seam cannot be completely avoided in this process since the switch-over of the scanning member does not occur without delay.

According to German Pat. No. 1,652,340, the image pattern consists of two partial patterns which are mirror symmetrical in circumferential direction which are arranged off-set by 180° on the circumference of the scanning cylinder and next to each other in the axial direction. To each partial pattern, a scanning member is assigned.

Each scanning member supplies an image signal to the engraving member when the partial pattern assigned to the scanning member is being scanned. The change-over of image signals occurs in each case after one-half cylinder rotation while the scanning members are scanning parts of the pattern coinciding with each other from the image content.

The control signals for switching over the image signals of both scanning members to the engraving members are produced by a pule generator which is described. For that reason, the problem also exists of aligning the reflectors precisely according to the partial patterns.

This process for seamless engraving does, to be sure, provide an exact seamless pattern, but is expensive and has several disadvantages. Since the partial patterns are to be arranged next to one another on the scanning cylinder, the scanning cylinder must have double the length of the printing cylinder. In addition, the partial patterns must have the same density values and must coincide very exactly in dimensions and to the pattern. In that context, the material thickness and the size alteration on the basis of temperature fluctuations in the working areas must be taken into consideration. The demands on the reproduction photographic departments in the production of image patterns are therefore very great and are very expensive.

U.S. Pat. No. 3,760,098 discloses a further process for seamless engraving in which scanning cylinder and printing cylinder have the same circumferential lengths and in which the image signal is stored intermediately in a memory during reproduction. Seamless formation is avoided in that the image dots scanned from the seam of the image pattern are suppressed, in other words, are not recorded and the missing cuplets on the printing cylinder are supplemented by a duplicate read-out of some stored image points and by engraving of the corresponding cuplets.

This process, however, has the considerable disadvantage that because of the multiple registering of some image dots, a false image content of the reproduction occurs because of the scanned image pattern.

The proposed and already described engraving unit does not, to be sure, allow a seamless engraving without supplementary devices if only the length of the image patterns correspond in the circumferential direction very exactly to the circumferential length of the printing cylinder. If, however, the possibility exists of adjusting the beginning and ending of the scanning on the basis of the image pattern, then small length deviations in the image pattern can be eliminated in a simple manner whereby the expense in the image pattern production can be substantially reduced.

The invention therefore has the underlying objective of a process in which the beginning and ending of scanning can be very precisely adjusted in order to eliminate the enumerated disadvantages. Advantageous further developments are indicated in the disclosure and claims.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
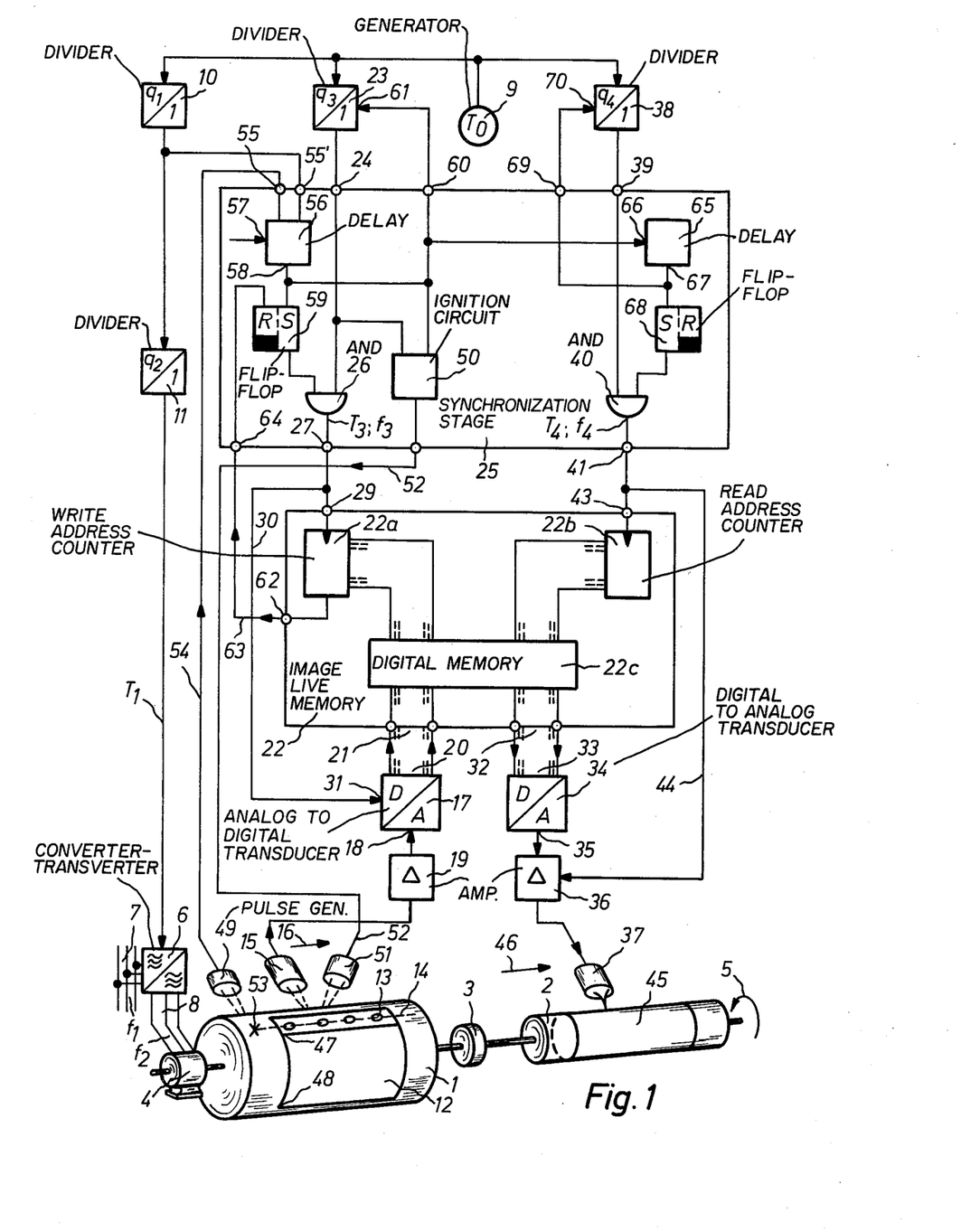
FIG. 1 is a block circuit diagram of an engraving unit illustrating the synchronization stage of the invention.

FIG. 1 illustrates a fundamental block diagram of an engraving unit with the inventive synchronization device disclosed therein.

A scanning cylinder 1 and a printing cylinder 2 of an engraving unit are connected to each other via the coupling 3 so that they rotate together. The scanning cylinder 1 has a constant circumference and as a permanent component of the engraving unit whereas the printing cylinders of varying diameters and circumferences can be installed in the engraving unit so as to accomplish various jobs. In the illustrated embodiment, a printing cylinder 2 is installed in the engraving unit which has a diameter which is about one-third of the diameter of the scanning cylinder 1. It is to be realized that the diameters and circumferences bear the same ratios to each other.

The scanning cylinder 1 and the printing cylinder 2 are driven in the direction of the arrow 5 by a synchronous motor 4. The synchronous motor 4 is fed through a converter 6 which produces a controlled output power supply at a frequency of $f_2$ which is dependent on the frequency of the command pulse sequence $T_1$ of the converter or transverter 6. The number of revolutions of the synchronous motor 6 will be proportional to the frequency $f_2$ of the controlled power supply 8 and, thus, also will be proportional to the frequency of the common pulse sequence $T_1$.

In the sample embodiment, the command pulse sequence $T_1$ is obtained by frequency division from a pulse sequence $T_0$ of a generator 9. For this purpose, a first divider stage 10 which has a dividing factor $q_1$ and which is adjustable receives the output of the generator 9. A second divider stage 11 with a constant divider factor $q_2$ are connected between the generator 9 and the transverter 6.

By adjusting the dividing factor $q_1$ of the divider stage 10, the frequency of the command pulse sequence $T_1$ and, thus, the speed of the synchronous motor 4 as well as the speed of the scanning cylinder 1 and printing cylinder 2 can be varied.

On the scanning cylinder 1, an image pattern 12 is precisely positioned with the aid of registering pegs 13 which are arranged on a generatrix 14 of the scanning cylinder 1. So as to obtain an image signal, the image pattern 12 is opto-electronically scanned by a scanning member 15 image line by image line. By means of advanced device not shown the scanning member can be moved parallel to the scanning cylinder in the direction of arrow 16.

For the digitalization of the analog image signal an analog to digital transducer 17 receives the output of the scanning device 15 through an amplifier 19. The digital output 20 of the analog to digital transducer 17 is supplied to the data input terminals 21 of an image line memory device 22 with a write-address counter 22a, a read address counter 22b and a digital memory 22c.

The image line memory device 22 is described in detail in German Patent Application P 25 08 734.7.

A scanning pulse sequence $T_3$ having a frequency of $f_3$ serves to govern the scanning, the analog to digital transformation of the image signal in the analog to digital transducer 17 and the writingin of the data into the digital memory 22c.

In the invention, the scanning is initiated by defined starting of the scanning pulse sequence $T_3$ and terminated by stopping of the scanning pulse sequence $T_3$.

The scanning pulse sequence $T_3$ which is obtained by frequency division from pulse sequence $T_0$ of the generator 9 in a frequency divider stage 23 whose divider factor $q_3$ is adjustable passes through an input 24 of a synchronization stage 25 to an AND gate 26 and from the output which corresponds to the output 27 of the synchronization stage 25 to the input 29 of the write-address counter 22a for selecting the write-addresses and through a line 30 to the control input 31 of the analog to digital transducer 17 for governing the analog to digital transformation.

For re-obtaining the image signal from the storage data, the data outputs 32 of the image line memory device 22 are connected to the digital inputs 33 of a digital to analog transducer 34. The analog output 35 of the digital to analog transducer 34 is connected by way of an engraving amplifier 36 to the engraving member 37.

For governing the reading operation of the data from the digital memory 22c and for rastering on the image pattern 12 during engraving a recording pulse sequence $T_4$ with the frequency of $f4$ is provided. The recording pulse sequence $T_4$ is also obtained from the pulse sequence $T_0$ of the generator 9 by frequency division in a divider stage 38 having a constant divider factor $q_4$. The recording pulse sequence $T_4$ passes from the divider stage 38 and to an input 39 of the synchronization stage 25 and to further AND gate 40 and from the output thereof which corresponds to an output 41 of the synhronization stage 25 to the input 43 of the read-address counter 22b for selecting the read-addresses and by way of a line 44 to the engraving amplifier 36 for rastering on the image pattern.

In the engraving amplifier 36 the recording pulse sequence $T_4$ is converted into a sine-shaped alternating voltage and this is superimposed on the image signal. The engraving member 37 has an engraving needle as a cutting tool and performs the engraving 45 on the printing cylinder 2 whereby the engraving 45 covers the entire circumference of the printing cylinder 2. Since the reproduction is carried out at a scale of 1:1 and the circumference of the scanning cylinder 1 in the sample embodiment is three times as large as that of the printing cylinder 2, the image pattern 12 covers only a third of the circumference of the scanning cylinder 1.

The engraving member 37 can also be moved parallel to the printing cylinder 2 in the direction of arrow 46 with the aid of an advanced device not shown.

In the described engraving unit, the scanning member 15 and the engraving member 37 are not moved during scanning or respectively recording of an image line. The scanned image lines are therefore parts of parallel circumferential lines of the scanning cylinder 1. In the same way, the cuplets are engraved on parallel circumferential lines of the printing cylinder 2.

The pre-requisites for the engraving of cuplets arranged without gaps on a circumferential line of the printing cylinder 2 is that an integral number $Z_D$ of cuplets are engraved on this circumferential line. This condition is accomplished by the selection and adjustment of the number of revolutions during a fixed time unit of the cylinders.

Since the cuplet depth to be engraved is determined by the gray tone value of the assigned image dot on the image pattern 12, the number $Z_A$ of the image dots scanned from start to finish of an image line of the image pattern must be equal to the number $Z_D$ of the cuplets engraved onto a close circumferential line of the printing cylinder 2, whereby the interval of two image dots corresponds to the interval of two cuplets.

This condition is accomplished by a suitable adjustment of the frequency $f3$ of the scanning pulse sequence $T_3$ with the aid of a divider stage 23.

The following gives more detail explanation of the operation of the scanning and engraving operations.

The first image dots of an image line is to be scanned at the upper edge 47 of the information bearing part of the image pattern 12 and the last image dot at the bottom edge 48 so that the edges of the image pattern 12 are not reproduced. The number of revolutions of the cylinders and the frequency $f3$ of the scanning pulse sequence $T_3$ are selected in such a way that on an image line from the top edge 47 to the bottom edge 48 of the image pattern 12 exactly $Z_A$ image dots are scanned.

With each pulse of the scanning pulse sequence $T_3$ that particular image dot is scanned which is located in the optical axis of the scanning member 15 at the time of the pulse. Therefore, the scanning pulse sequence $T_3$ must be started in such a way that at the pulse time of the first pulse of the scanning pulse sequence $T_3$ the first image dot at the top edge 47 of the image pattern 12 is just situated under the scanning member 15.

The accomplishment of this object is obtained by using a command "scanning start" by means of a time delay from a circumferential pulse derived from the rotary motion of the cylinders.

The command "scanning start" then starts the scanning pulse sequence $T_3$ in a defined phase position.

The time delay is adjusted and selected by an operator on the basis of the image pattern 12 to be scanned while the cylinders are rotating. The adjustment must be sensitively and reproducibly possible so as to match with great exactness the accuracy of the reproduction. To this end the synchronization stage 25 and a pulse generator 49 are provided. For facilitating the adjustment, an optical auxiliary device in the invention consists of an ignition circuit 50 and a flash lamp 51 assigned to the scanning cylinder 1 and the flash lamp 51 is connected through a line 52 to the ignition circuit 50. The optical auxiliary device is depicted in greater detail in FIG. 2.

The pulse generator 49 produces by photo-electric scanning of an index mark 53, one circumferential pulse per cylinder rotation. The index mark 53 is arranged on the generatrix 14 on which the registered pegs 13 are also located.

Since the optical axis of the pulse generator 49 and scanning member 15, meet the surface of the scanning cylinder 1 on a generatrix the circumferential pulse is produced at exactly the moment when the registered pegs 13 are located under the scanning member 15. The pulse generator 49 is connected by way of line 54 to an input 55 of a delay stage 56 in the synchronization stage 25. The second input 55' of the delay stage 56 is connected to the output of the divider stage 10.

In the delay stage 56 command "scanning start" is produced by delay of the circumferential pulse.

The time delay which can be influenced by way of an adjustment input 57 of the delay stage 56 must be adjusted in such a way that the command "scanning start" is given at that point in time at which the first image dot to be scanned is located under the scanning member 15.

The operation of the synchronization stage 25 is as follows: The output 58 of the delay stage 56 is conducted to the setting input of RS flip-flop 59 and through the output 60 of the synchronization stage 25 to the reset input 61 of the divider stage 23. The Q output of the RS flip-flop 59 is connected to the other input of the AND gate 26. The command "scanning start" appearing at the output 58 of the delay stage 56 initially sets the RS flip-flop 59. The Q output of the RS flip-flop 59 then lies in the H region and releases the AND gate 26 for the scanning pulse sequence $T_3$.

Simultaneously, the command "scanning start" resets the divider stage 23 so that the scanning pulse sequence $T_3$ at this instant always appears with the same phase position at the input 24 of the synchronization stage 25.

With the command "scanning start" the first pulse of the scanning pulse sequence $T_3$ passes through line 30 to the analog to digital transducer 17 and there initiates the analog to digital transformation of the image signal into the date of the first image dot.

These data which are available at the digital outputs 20 of the analog to digital transducer 17 are stored in the digital memory 22c of the image line memory device 22. In the same way the data of the following image dots of the first image line are stored.

With the Z-th pulse of the scanning pulse sequence $T_3$, finally, the data of the last image dot of the first image line are written into the digital memory 22c.

The the write-address counter 22a produces a command "scanning end" at a signal output 62 of the image line memory device 22. This command "scanning end" resets the RS flip-flop 59 by way of a line 63 and input 64 of the synchronization stage 25 and the reset input. The Q output of the RS flip-flop 59 passes into the L region and the AND gate 26 is blocked for all further pulses of the scanning pulse sequence of $T_3$ whereby the scanning operation for the first image line is terminated.

Since with an exactly produced image pattern 12, the length from the top edge 47 to the bottom edge 48 of the information carrying part of this image pattern 12 exactly corresponds to the circumference of the printing cylinder 2 and since the frequency $f3$ of the scanning pulse sequence $T_3$ is adjusted in such a way that the Z image dots are scanned from the information carrying part of the image pattern 12, the scanning operation is terminated exactly at the bottom edge 48 of the image pattern 12 by the command "scanning end". According to the invention, the bottom edge of the image pattern 12 thus also remains out of consideration in the reproduction process. In addition, a seamless engraving can also be accomplished. An advantageous further development of the invention consists in the shifting by delicately stepped alteration of the frequency of the scanning pulse sequence $T_3$, the command "scanning end" in relationto the image pattern 12 in such a way that even with image patterns in which the interval between the edges 47 and 48 do not exactly correspond to the circumferential length of the printing cylinder 2 a precise seamless engraving is accomplished. This process is described in detail with reference to FIG. 6. The command "scanning end" additionally governs the advancing movement on the scanning side after conclusion of which the scanning of the next image line occurs.

The beginning of engraving on the printing cylinder 2 is determined by command "engraving start" which begins the recording pulse sequence $T_4$ at a set instance and in a defined phase position. Each pulse of the recording pulse sequence $T_4$ determines the instance of the engraving of a cuplet.

Figure 5:
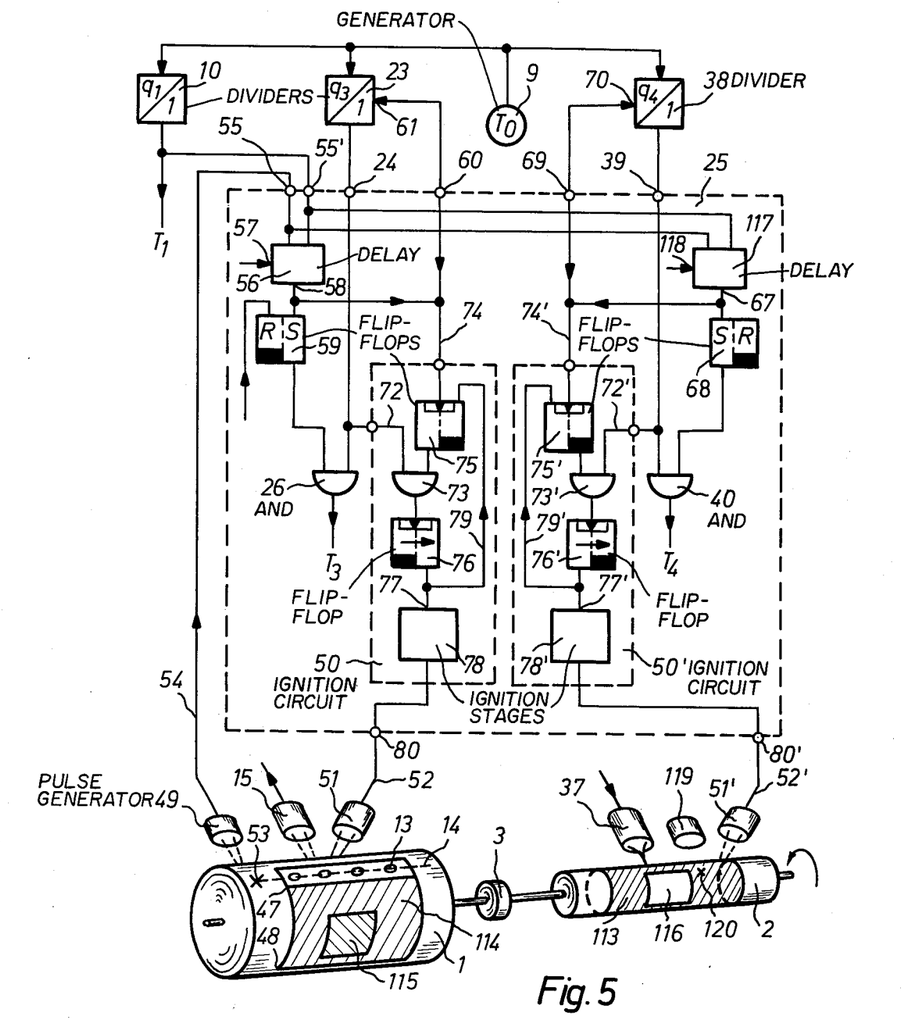
FIG. 5 is a preferred embodiment of the synchronization stage and the optical auxiliary device for adjusting the beginning of scanning and engraving.

The command "engraving start" is derived by time delay in a further time delay stage 65 from the command "scanning start". The time delay is constant and takes into consideration only the transit time of the electronic system. an advantageous further development of the invention consists in adjusting the time delay by fine stepping in order to be able to vary the engraving start in relation to the printing cylinder. This process is illustrated in FIG. 5. For obtaining the command "engraving start" the output 58 of the delay stage 56 is connected to an input 66 of the delay stage 65. The output 67 of the delay stage 65 is conducted to the set input of a further RS flip-flop 68 and from an ouput 69 of the synchronization stage 25 to the reset input 70 of the divider stage 38. The Q output of RS flip-flop 68 is connected to the other input of the AND gate 40.

With the command "engraving start" the first pulse of the recording pulse sequence $T_4$ appears at the pulse input 43 of the read-address counter 22b of the image-line memory device 22 and initiates the read-operation for the data of the first image dot and the engraving of the first cuplet of the first circumferential line. After the engraving of a closed circumferential line, the recording is interrupted and the advancing movement of the engraving member is carried out in the direction arrow 46. After this, the engraving of the second circumferential line commences.

Figure 2:
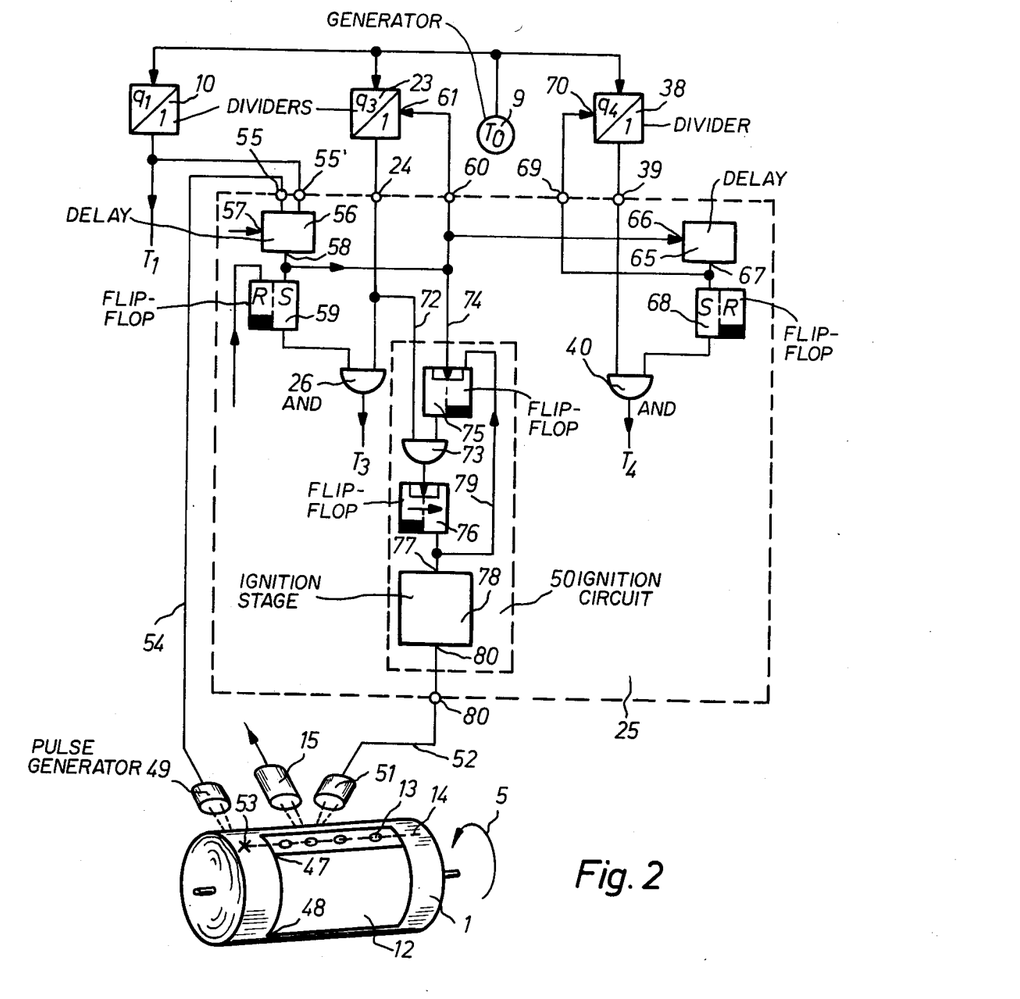
FIG. 2 is a sample embodiment of the synchronization stage and the optical auxiliary device for adjusting the beginning of scan.

FIG. 2 illustrates a sample embodiment of the synchronization stage 25 and of the optical auxiliary device which members are utilized in the invention for adjusting the beginning of reproduction.

For sake of clarity, only those parts from FIG. 1 which are essential for an understanding of the invention are illustrated in FIG. 2.

The optical auxiliary device consists of the ignition circuit 50 and the flash lamp 51. The input 24 of the synchronization stage 25 is connected through a line 72 to the input of a AND gate 73 in the ignition circuit 50.

The output 58 of the delay stage 56 is conducted through line 74 to the pulse input of a flip-flop 75 in the ignition circuit 50.

The Q output of the flip-flop 75 is connected to the second input of the AND gate 73. The output of the AND gate 73 is connected to the pulse input of a monostable flip-flop 76 which has a Q output which is identical to the input 77 of an ignition stage 78.

By way of line 79 the flip-flop 75 can be reset from the Q output of the mono-stable flip-flop 76.

The output 80 of the ignition stage 78 is ultimately connected to the flash lamp 51 through line 52.

The flash lamp 51 is aligned in such a way that it illuminates the area of the image pattern 12 lying under the scanning member 15. The scanning member 15 is equipped with a reflection device not illustrated consisting of a viewing hood with a ground glass plate and a magnifying glass and a passive reflector.

If the passive reflector is located in the beam path, then the area of the image pattern picked up by the scanning optics is displayed on the ground glass plate and can be observed through the magnifying glass as magnified by the operator.

On the ground glass plate a circle is located as a reference mark in the center of which the image dot is precisely displayed which is situated in the optical axis of the scanning member 15. A preferred embodiment consists in a flash lamp installed in the scanning member 15. The illumination of the image pattern 12 by the flash lamp 51 then occurs, for example, by way of light conductors.

The operation of the ignition circuit 50 is as follows: When the index mark 53 on the scanning cylinder 1 runs beneath the pulse generator 49, the circumferential pulse passes to the delay stage 56 of the synchronization stage 25 and is delayed there. The delayed signal is the command "scanning start" which triggers the flip-flop 75. The Q output of the flip-flop 75 passes into the H region whereby the AND gate 73 is prepared. The first pulse of the scanning pulse sequence $T_3$ appearing in the input of the AND gate 73 after flipping of the flip-flop 75 passes to the mono-stable flip-flop 76. After the mono-stable flip-flop 76 has received such pulse, the Q output of the mono-stable flip-flop lies in the H region and the ignition stage 78 is actuated. By this manner the flash lamp 51 is fired for a period determined by the ignition stage 78 and the flip-flop 75 is reset by way of line 79.

The AND gate 73 is blocked by this process for all further pulses of the scanning pulse sequence $T_3$ and only one flash per revolution of the scanning cylinder 1 is produced which is when the command "scanning start" occurs. It is the operator's task to bring the top edge 47 of the image pattern 12 into coincidence with the locally fixed reference mark on the ground glass plate of the viewing hood of the scanning member 15 at the moment of flash by adjusting the delay time of the delay stage 56 by way of the adjustment input 57. In this way the beginning of scanning at the top edge 47 of the image pattern 12 is exactly determined.

The mono-stable flip-flop 76 fulfills the following function. In FIG. 1 it was described that the scanning pulse sequence $T_3$ also governs the analog to digital conversion of the image signal in the analog to digital transducer 17. The conversion time starts with the front flank of the scanning pulse sequence $T_3$. During the conversion time, the analog to digital transducer 17 requires a constant median image signal which corresponds to the gray tone value of the scanned image dot. The median image signal is obtained by integration of the image signal over a time period synchronized with the scanning pulse sequence $T_3$. By the use of an additional time delay which is independent of the operator's adjustment the light flash can be shifted into the middle of the integration region whereby the exact timing of the light flash can be obtained in a very advantageous manner.

Figure 3:
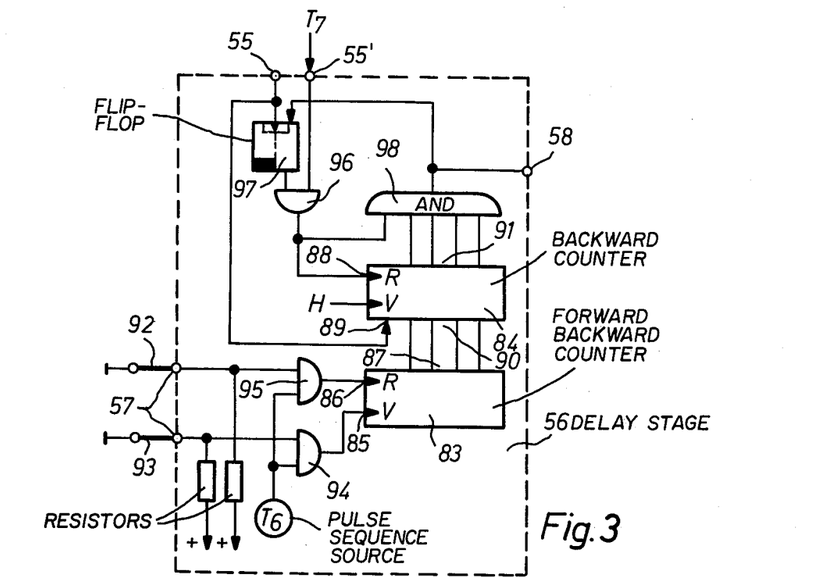
FIG. 3 illustrates a circuit for delaying the circumferential pulse.

FIG. 3 illustrates a preferred embodiment of the delay stage 56. It consists essentially of a forward-backward counter 83 and a backward counter 84. Both counters may be of type SN 74 193 available from Texas Instruments Company. These components are available on the open market and will not be described in detail.

The forward-backward counter 83 has a forward counting input 85 and a backward counting input 86 and a plurality of outputs 87.

The backward counter 84 has a backward counting input 88, an acceptance input 89 and information inputs 90 and information outputs 91. Depending on the position of the keys 92 and 93 at the adjustment input 57 of the delay stage 56 a counting pulse sequence $T_6$ passes either through an AND gate 94 to the forward counting input 85 or through an AND gate 95 to the backward counting input 86. The outputs 87 of the forward-backward counter 83 are connected to the information inputs 90 of the backward counter 84.

A counting pulse sequence $T_7$ for the backward counter 84 passes from the output of the divider stage 10, not shown, to the input of an AND gate 96 which coincides with the input 55' of the delay stage 56.

The AND gate 96 is controlled by way of a flip-flop 97 by the circumferential pulse existing at the input 55 of the delay stage 56. For this purpose, the input 55 is connected to the pulse input of the flip-flop 97 which has its Q output conducted to the second input of AND gate 96. The input 55 is also connected to the acceptance input 89 of the backward counter 84.

The output of the AND gate 96 is supplied to the backward counting input 88 of the backward counter 84. The output 91 of the backward counter 84 are furnished through and additional AND gate 98 whose output is identical to the output 58 of the delay stage 56 and at which the command "scanning start" appears.

The adjustment of the time delay is done in the following fashion. The forward-backward counter 83 and the backward counter 84 may be reset. The key 93 is momentarily depressed. During this time a certain number of pulses of the pulse sequence $T_6$ is counted into the forward-backward counter 83. With the appearance of the circumferential pulse at the acceptance input 89 of the backward counter 84, the counter reading of the forward-backward counter 83 is supplied over into the backward counter 84. Simultaneously, the flip-flop 97 is set and the AND gate 96 is prepared. In this manner, the counting pulse sequence $T_7$ reaches the backward counting input 88 of the backward counter 84. The backward counter 84 is emptied and at a reading of zero for this counter, there will appear at the output 58 of the delay stage 56 a signal corresponding to the command "scanning start". This signal resets the flip-flop 97 and blocks the AND gate 96 so that no further pulses of the counting pulse sequence $T_7$ reach the backward counting input 88. The delay time between the circumferential pulse and command "scanning start" pulse is thus dependent on the counter reading taken from the forward-backward counter 83 and on the frequency of the counting pulse sequence $T_7$. The counter reading of the forward-backward counter 83 in turn is dependent on how long the key 93 is depressed by the operator.

If the counter reading is too low, corresponding to a delay time which is too brief, the key 93 is again depressed; and if conversely the counting reading is too large corresponding to a delay time which is too long, the key 92 is depressed and a part of the information contained in the forward-backward counter 83 is removed.

The frequency of the counter pulse sequence $T_6$ in a particular embodiment was selected to be about 4Hz. The shortest contact time of the key that can be accomplished by the operator is about 0.25 seconds. Thus, by a single depression of one or the other keys the counter reading of the forward-backward counter 83 can be altered by a count of 1.

The smallest achievable delay time thus corresponds to one period of the counting pulse sequence $T_7$. The frequency of this counting pulse sequence $T_7$ is matched to the number of revolutions of the scanning cylinder 1 in such a way that the distance which a dot on the surface of the scanning cylinder 1 covers during the briefest delay time is always less than the permitted matching error.

Since the counting pulse sequence $T_7$ is derived from the pulse sequence required for governing the transverter there results an advantage of the invention that an automatic adaptation of the frequency of the counting pulse $T_7$ and, thus, the smallest adjustable delay time to the number of revolutions of the scanning cylinder 1.

Figure 4:
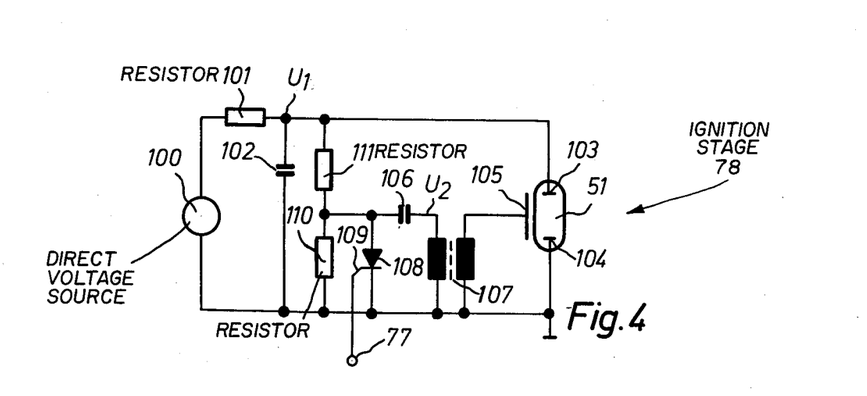
FIG. 4 illustrates an ignition circuit.

FIG. 4 illustrates a sample embodiment of an ignition stage 78 for the flash lamp 51. The flash lamp 51 is a xenon gas filled impulse discharge lamp for producing brief intense light flashes. The ignition stage 78 consists of a direct voltage source 100 which charges a capacitor 102 to the voltage $U_1$ through a resistor 101. The flash lamp 51 is parallel to the capacitor 102. The flash lamp 51 has an anode 103, a cathode 104 and an ignition electrode 105. The ignition circuit consists of a further capacitor 106 and an ignition transformer or transmitter 107.

The primary winding of the ignition transformer 107 is in series with the capacitor 106. Parallel to the primary winding is connected a thyristor 108 which can be ignited with a control electrode 109. The secondary winding of the ignition transformer 107 is connected between the ignition electrode 105 and the cathode 104 of the flash lamp 51. The capacitor 106 is charged with a voltage $U_2$ which is derived from the voltage $U_1$ with the aid of a voltage divider comprising the resistors 110 and 111.

A control pulse is connected to the input terminal 77 of the ignition stage 78 to control the firing of the thyristor 108 and the ignition pulse for the flash lamp 51 is produced in the ignition transformer 107. As soon as the voltage $U_1$ at the capacitor 102 has sunk below the voltage level required to sustain illumination in the flash lamp 51, the lamp will go out.

FIG. 5 illustrates a sample embodiment of the synchronization stage 25 and the optically auxiliary device for carrying the inventive process of subsequently engraving an image pattern into the already partially engraved printing cylinders. In the drawing to illustrate the example of prior engraving which has previously been accomplished on the printing cylinder such prior or first engraving 113 illustrated in the drawing. An image pattern 114 for the first engraving 113 has already been removed from the scanning cylinder 1 and is therefore depicted only in broken lines. The scanning cylinder 1 now carries an image pattern 115 for the subsequent engraving which is to be executed on a field 116 of the printing cylinder 2 which remain free during the first engraving 113. It is also important that the field 116 exactly matches the location of the image pattern 115.

The angular position between the cylinders 1 and 2 has been lost because when the printing cylinder is implaced the second time, the prior indexing which existed during the first engraving no longer exists so that the cylinders are now at a slightly twisted angle relative to each other and subsequent engraving would be incorrectly positioned relative to the first engraving by such angle.

So as to correct for the match-up error arising during the subsequent engraving in the circumferential direction of the printing cylinder 2, the engraving start according to the present invention can also be altered by using the circumferential pulse and an adjustable time delay of the command "engraving start".

For this purpose, there is present in the synchronization stage 25 a further delay stage 117 which has a delay time which can be altered by way of the adjustment input 118. This delay stage 117 is identical in structure to the delay stage 56 shown in FIG. 3 and a detailed description of the delay stage 117 will not be repeated for this reason. To adjust the engraving start in relation to the rotating printing cylinder 2, the printing cylinder 2 also has an ignition circuit 50', a flash lamp 51' and a microscope 119. The microscope 119 serves for the precise observation of a reference mark 120 which has already been applied on the printing cylinder before the first engraving and defines the reference mark where the first cuplet of the engraving is to be located.

The microscope 119 is mounted such that its optical axis meets the printing cylinder 2 on the same generatrix as that of the tip of the engraving needle of the engraving member 37. The flash lamp 51' is aligned in such a way that the area of the surface of the printing cylinder 2 within the field of the microscope 119 is well illuminated by the light flash.

The time delay in the delay stage 117 must now be adjusted by an operator in such a way that the command "engraving start" or respectively the light flash of the flash lamp 51' appears very exactly such that the reference mark 120 passes through the optical axis of the microscope 119 at the light flash. If this adjustment of the engraving start is carried out not only during the first engraving, but also during the subsequent engraving it will be assured that all subsequent engravings will be precisely indexed and matched in the circumferential direction to the first engraving.

Figure 6:
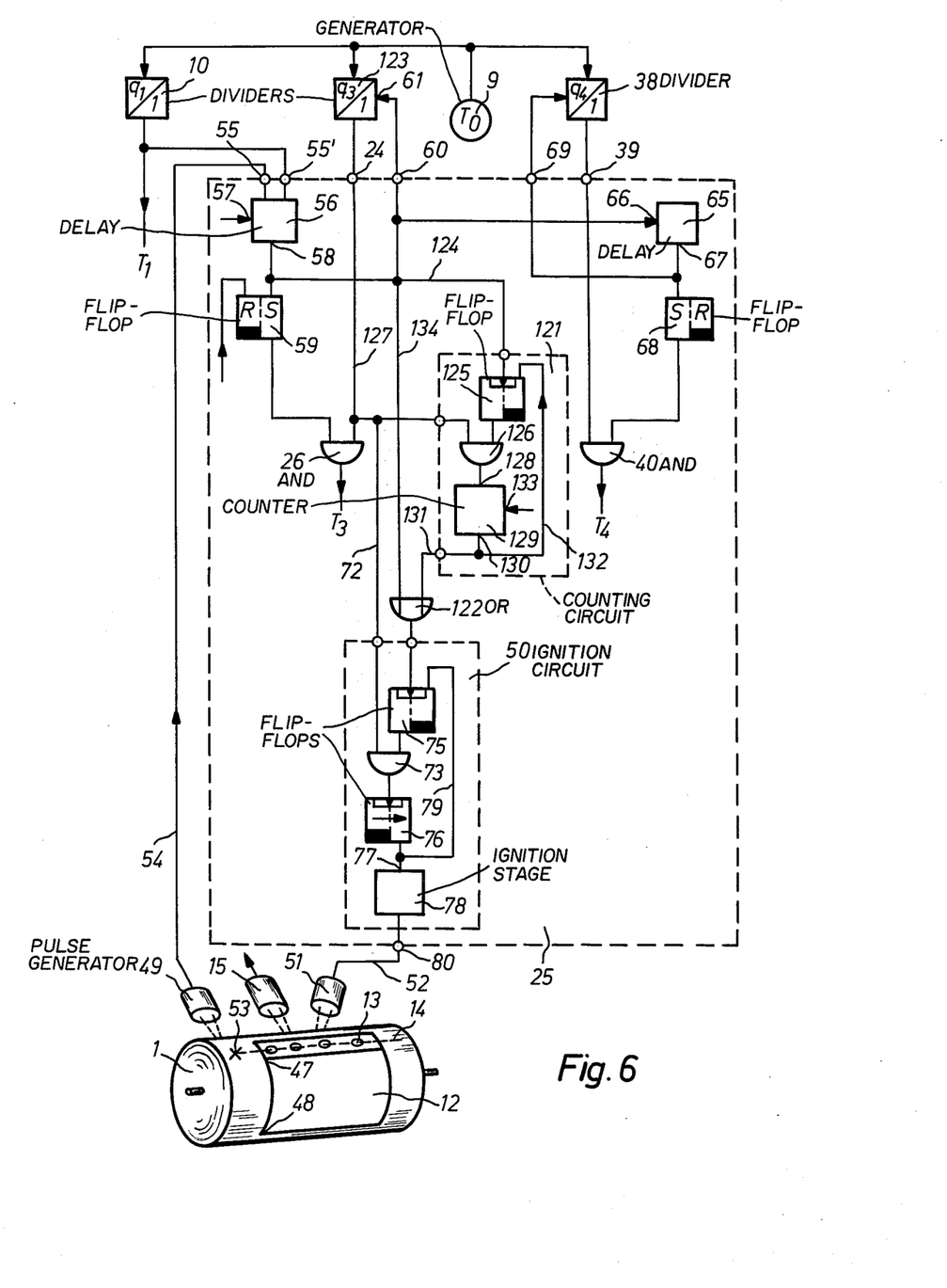
FIG. 6 is an illustrated embodiment of the synchronization stage and optical auxiliary device for adjusting the beginning and ending of scanning.

FIG. 6 illustrates an embodiment of the synchronization stage 25 and of the optical auxiliary device for accomplishing the engraving of endless patterns with the invention. For this purpose, there is mounted on the scanning cylinder 1 an image pattern 12 which has an image content identical at the top edge 47 and at the bottom edge 48. Because of production errors, however, the distance between the edges 47 and 48 does not exactly correspond to the circumferential distance of the printing cylinder to be engraved so that an exact seamless engraving is not possible. The invention allows the adjustment of the scanning start and the scanning end and permits the production of an exact endless pattern even if the dimensions of the image pattern 12 were not precisely followed.

As described in FIG. 1, the number $Z_A$ of the image dots scanned from one image line of the image pattern 12 is precisely as large as the number $Z_D$ of the engraved cuplets on a circumferential line of the printing cylinder 2.

If the adjustment of the scanning start at the top edge 47 of the image pattern 12 is performed with the aid of a stroboscopic device such as shown in FIG. 2 and if the flash lamp 51 is fired again after $Z_A$ scanned image dots then, with an exactly produced image pattern, the bottom edge 48 of the image pattern 12 and the locally fixed reference mark of the scanning member 15 will be in coincidence at the time of the light flash. In this way, the last image dot of an image line of the image pattern 12 is scanned exactly at the bottom edge 48.

If, however, as assumed in the sample embodiment, the length of the image pattern 12 does not exactly correspond in the circumferential direction to the circumferential length of the printing cylinder 2, then without adjusting the end of scanning, the last image dot will be scanned beyond the bottom edge 48 of the image pattern 12 which means that seamless engraving will not be achieved.

However, if according to the present invention the end of scanning is also adjustable, then the error in length of the image pattern 12 can be compensated.

The arrangement described in FIG. 2 for adjusting the beginning of scanning is expanded by adding a counting circuit 121 and an OR gate 122. The frequency divider 23 is replaced by a continuously adjustable frequency divider 123 which allows the frequency $f_3$ of the scanning pulse sequence $T_3$ to be varied for adjusting the end of scanning.

With such an arrangement the output 58 of the delay stage 56 is connected by line 124 to the pulse input of the flip-flop 125 of the counting circuit 121. The Q-output of the flip-flop 125 is conducted to one input of an AND gate 126. The second input of AND gate 126 is connected by a line 127 to the scanning pulse sequence T₃. The output of AND gate 126 is connected to the counting input 128 of a counter 129. The output 130 of the counter 129 is connected by line 131 to OR gate 122, which supplies an input to the flip-flop 75 of the ignition circuit 50. The output of counter 129 is also supplied by line 132 to the reset input of the flip-flop 125. The counter 129 is preset by way of a programming input 133 to the number ($Z_A + 1$) of the image dots to be scanned.

When the command "scanning start" appears at the output 58 of the delay stage 56, the ignition circuit 50 will be triggered by the line 72 and the OR gate 122 and a light flash that can be used for the adjustment of the scanning start is produced.

Simultaneously, the command "scanning start" flips the flip-flop 125 of the counting circuit 121 through line 124. The Q output passes into the H region whereby the AND gate is enabled.

As a counting pulse the scanning pulse sequence $T_3$ reaches the counting input 128 of the counter 129 through the AND gate 126. Since the counter 129 is preset to the number ($Z_A + 1$) the counter 129 emits after counting ($Z_A + 1$) incoming pulses of the scanning pulse sequence $T_3$, a pulse by way of the output 130 and the OR gate 122 to the ignition circuit 50 which, thus, again triggers a light flash for adjusting the end of scanning when the last image dot is scanned.

If at the time of the light flash the bottom edge 48 of the image pattern 12 and the locally fixed reference mark of the scanning member 15 are not in coincidence then in the invention by using the frequency divider 123 the frequency $f_3$ of the scanning pulse sequence $T_3$ must be varied until the coincidence of reference mark and bottom edge 48 of the image pattern is achieved.

The frequency alteration of the scanning pulse sequence $T_3$ by way of input frequency of the frequency divider stage 123 must be possible in stages of the order of magnitude $10^{-5}$ if the adjustment of the end of scanning is to be accomplished with matching exactness. This requirement can only be realized with a conventional frequency divider having an integral dividing factor if the frequency division is performed by very high input frequency. This means that the frequency divider has a large dividing factor. Such a solution is expensive and often cannot be practically accomplished.

Figure 7:
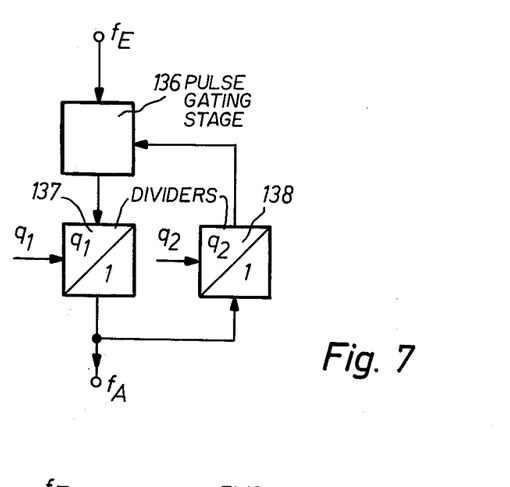
FIG. 7 is a block diagram of a frequency divider circuit.

FIG. 7 is a fundamental block circuit diagram of an inventive frequency divider for solving this problem. The dividing factor $q$ is a decimal number and the input pulse frequency $f_E$ is to be divided. The signal of frequencies $f_E$ is supplied to a pulse gating stage 136 and then to a first adjustable frequency divider 137 having a dividing factor of $q_1$. The output of the frequency divider 137 is the desired output pulse train having the output frequency $f_A$ is fed back by way of a second adjustable frequency divider 138 having a dividing factor $q_2$ which supplies an output to the pulse gating stage 136. With this arrangement, the pulses appearing at the output of the frequency divider 138 accomplishes pulse sequence gating of the input signal in the pulse gating stage 136 to reduce the frequency of the input signal $f_E$.

The relationship between the input frequency $f_E$ and the output frequency $f_A$ is given by the expression:

$$f_A = \frac{f_E}{q} = \frac{f_E}{q_1 + 1/q_2}$$

In this equation, $q_1$ is the integral part of the decimal number representing the total dividing factor $q$; and $q_2$ is the reciprocal decimal fraction of this decimal number.

Figure 8:
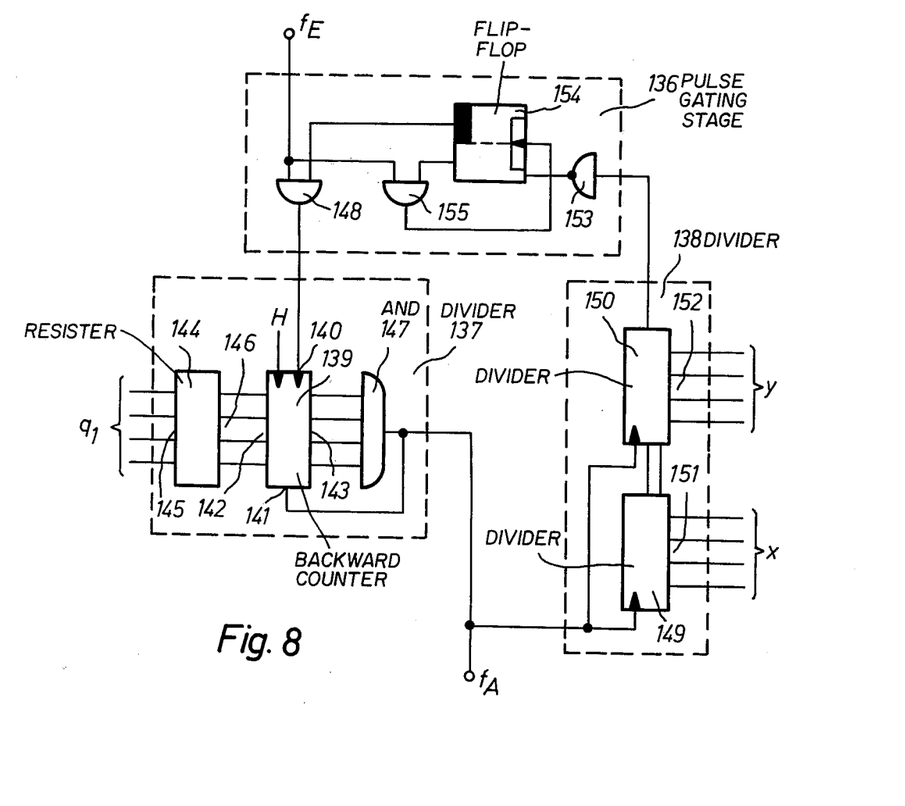
FIG. 8 is a block diagram of the frequency divider circuit.

FIG. 8 illustrates a sample embodiment of the inventive frequency divider stage which has a dividing factor $q$ which is precisely adjustable up or downwardly in hundredths. The frequency divider stage consists of the following functional groups:

A first divider stage 137, a second divider stage 138 and a pulse gating stage 136.

The first divider stage 137 is constructed of a backward counter 139 which has a backward counting input 140, a reset input 141 and has information inputs 142 and information outputs 143. The register 144 has data inputs 145 and data outputs 146. AND gate 147 receives the ouputs 143 of backward counter 139. The data outputs 146 of the register 144 are connected to the information inputs of the backwards counter 139. The outputs 143 of the backwards 139 and of the backwards counting input 140 are connected to the inputs of the AND gate 147 which supplies its output to the reset input 141. The output of the AND gate 147 forms the output of the first divider stage at which the divided pulse sequence with the frequency $f_A$ appears. The dividing factor $q_1$ of the first divider stage 137 is supplied as a dual number into the register 144 through the data inputs 145 and into the backwards counter 139 by way of the information inputs 142.

The input pulse sequence with the input frequency of $f_E$ passes through an AND gate 148 to the backwards counting input 140 of the backwards counter 139 and counts out the information taken from the register 144. After a number of pulses of the input sequence determined by the dividing factor $q_1$ the counter reading of zero will be obtained.

The backwards counter 139 is reset and at the output of the first divider stage 137 a pulse will be generated which triggers the second divider stage 138. After this a new counting cycle will begin.

The second divider stage 138 has, in the sample embodiment the dividing factor of $q_2 = (100/xy)$, where $x$ corresponds to the number with the significance of tenths and $y$ corresponds to the number with the significance of hundredths.

The second divider stage 138 is preferably constructed of two decimal frequency dividers 149 and 150 which can be of type SN 74 167 and can be connected in cascade. The dividing factor of the decimal frequency divider 149 amounts to $(10/x)$ and that of the decimal frequency divider 150: $(10/y)$, whereby $x$ and $y$ are selectable adjustable digits between 0 and 9 at the programmming inputs 151 and 152.

The output of the second divider stage 138 is connected to the input of the pulse gating stage 136 through an inverter 153 and to the setting input terminal of a flip-flop 154. The Q output of the flip-flop 154 is connected to one input of an additional AND gate 155 which receives at its second input the input $f_E$ which is in the input signal to the pulse gating stage 136. The output of AND gate 155 is fed back to the pulse input of the flip-flop 154. The $\overline{Q}$ output of the flip-flop 154 is connected to the second input of the AND gate 148.

The output impulses of the frequency divider stage 138 set the flip-flop 154; the Q output of the flip-flop 154 passes into the H region and its $\overline{Q}$ output into the L region whereby the AND gate 148 is blocked and the AND gate 155 is set or prepared. In each case, the first pulse of the input pulse sequence appearing at the input of th pulse gating stage 136 after the setting of the flip-flop 154 is masked by the AND gate 148 and resets the flip-flop 154 through AND gate 155.

In the circuit arrangement according to FIG. 8, the relationship between the frequency $f_A$ of the output pulse sequence and the frequency $f_E$ of the input pulse sequence is defined by the following equation:

$$f_A = \frac{f_E}{q} = \frac{f_E}{q_1 + 0.01\,xy}$$

If, for example, a dividing factor of $q = 11.11$ is to be obtained, then $q_1$ equals 11; $x$ equals 1 and $y$ equals 1 and these values are the selected inputs.

Although it has been described with respect to preferred embodiments, it is not to be so limited, as changes and modifications may be made which are within the full intended scope as defined by the appended claims.

We claim:

1. A method for adjusting the beginning and ending of reproduction of an image pattern mounted on a rotating scanning cylinder onto a rotating recording cylinder, comprising opto-electronically scanning said image pattern dot by dot and line by line for obtaining an analog image signal, digitalizing said analog image signal, reconverting said digitalized image signal into an analog image signal, reproducing said image pattern with a recording member controlled by said analog image signal, wherein a fixed reference mark representing the position of the scanning member relative to the circumference of the rotating scanning cylinder and a start mark on the scanning cylinder representing the begin of scanning in each image line of said image pattern are available, obtaining a "scanning start" signal from circumferential pulse of the cylinder with the use of an adjustable time delay, and effecting coincidence of the marks when said "scanning start" signal arises by adjusting said time delay by visualization for instance by means of a stroboscope.

2. A method according to claim 1, in which the digitalization of the image signal is controlled by a scanning pulse sequence signal train and said "scanning start" signal starts the scanning pulse sequence signal train in a desired phase relationship.

3. A method according to claim 2, wherein the same number of pulses of the scanning pulse sequence signal train are continuously counted as there are image dots being scanned from an image line and that, with the last counted pulse, a "scanning stop" signal is generated, which interrupts the scanning pulse sequence signal train in a desired phase relationship.

4. A method for seamless engraving according to claim 3, wherein the digitalized image signal is written into an intermediate memory by means of the scanning pulse sequence signal train and read out by a recording pulse sequence signal train, wherein an end mark on the scanning cylinder is available representing the end of scanning in each image line of said image pattern, and effecting coincidence of said end mark and said reference mark when said "scanning stop" signal arises by shifting the "scanning stop" signal in time relative to the "scanning start" signal by altering the frequency of said scanning pulse sequence signal train by visualizing for instance by means of a stroboscope.

5. A method for subsequent engraving according to claim 4 wherein the image signal is written into an intermediate memory by the scanning pulse sequence signal train and read out by the recording pulse sequence signal train and in which the recording pulse sequence signal train additionally produces the printing raster, wherein a further fixed reference mark representing the position of the recording member relative to the circumference of the recording cylinder and a start mark on the recording cylinder representing the begin of engraving in each image line are available, obtaining an "engraving start" signal from said "scanning start" signal with the use of an adjustable time delay, effecting coincidence of the marks when said "engraving start" signal arises by adjusting said time delay by visualization for instance by means of a stroboscope and wherein said "engraving start" signal starts the recording pulse sequence signal train in a desired phase relationship.

6. Apparatus for adjusting the beginning and ending of reproduction of an image pattern mounted on a rotating scanning cylinder onto a rotating recording cylinder by means of a circumferential pulse comprising, means for adjusting the delay of a signal, a forward-backward counter which has a forward counting-input and backward counting-input which are alternately loaded with a first counting pulse sequence signal train in order to count in or out a number of pulses of said first counting pulse sequence signal train, a backwards counter which receives the output data of said forward-backward counter for accepting the counter reading and having an acceptance input which is connected to a signal source in order to initiate the acceptance of the counter reading with the signal, a coding circuit for encoding a counter reading of the backwards counter connected to the data output of said backwards counter whereby said coding circuit emits the delayed signal when the counter reading is reached, a switch, said backwards counting-input of the backwards counter is loadable with a second counting pulse sequence signal train through said switch and said switch can be switched on by said signal and switched off by said delayed signal.

7. Apparatus according to claim 6 for altering the frequency of the scanning pulse sequence signal train including an adjustable frequency divider which has a dividing factor which is a decimal number, said frequency divider including a pulse gating stage whose input is loadable with the scanning pulse sequence signal train which is to be altered, a first divider stage connected to the output of said pulse gating stage, and its dividing factor corresponds to the integral part of said decimal number, a second divider stage receiving the output of said first divider stage comprising the altered scanning pulse sequence signal train and the dividing factor of said divider stage equal to the reciprocal decimal fraction of the decimal number, and the output of said second divider stage connected to said pulse gating stage to gate pulses out of the scanning pulse sequence signal train.

* * * * *